(12) United States Patent
Astvatsaturov

(10) Patent No.: US 11,003,874 B1
(45) Date of Patent: May 11, 2021

(54) DEVICES AND METHODS FOR READING PICKLISTS

(71) Applicant: ZEBRA TECHNOLOGIES CORPORATION, Lincolnshire, IL (US)

(72) Inventor: Yuri Astvatsaturov, Lake Forest, IL (US)

(73) Assignee: Zebra Technologies Corporation, Lincolnshire, IL (US)

( * ) Notice: Subject to any disclaimer, the term of this patent is extended or adjusted under 35 U.S.C. 154(b) by 0 days.

(21) Appl. No.: 16/681,604

(22) Filed: Nov. 12, 2019

(51) Int. Cl.
  *G06K 5/00* (2006.01)
  *G06K 7/10* (2006.01)
  *G06K 7/14* (2006.01)

(52) U.S. Cl.
  CPC ....... *G06K 7/10861* (2013.01); *G06K 7/1417* (2013.01); *G06K 7/1443* (2013.01)

(58) Field of Classification Search
  CPC ............. G06K 7/10722; G06K 7/0881; G06K 10/732; G06K 7/10861

USPC ............ 235/462.24, 462.11, 462.25, 462.41, 235/462.42
See application file for complete search history.

(56) References Cited

U.S. PATENT DOCUMENTS

| | | | |
|---|---|---|---|
| 9,639,728 B1 * | 5/2017 | Handshaw | G06K 7/10722 |
| 10,671,824 B2 * | 6/2020 | Chen | G06K 7/10732 |
| 2015/0034724 A1 * | 2/2015 | He | G06K 7/1443 235/462.08 |
| 2017/0318206 A1 * | 11/2017 | Handshaw | H04N 5/335 |

* cited by examiner

*Primary Examiner* — Daniel St Cyr
(74) *Attorney, Agent, or Firm* — Yuri Astvatsaturov

(57) ABSTRACT

Devices and methods for reading picklists are disclosed herein. An example barcode reader device includes an imaging assembly to capture images while scanning over picklist. The barcode reader includes a processing platform configured to decode, for each image, any newly appearing decodable barcode within the image, evaluate, using positional tracking, whether a decodable barcode is within a decode region of a field view, thereby indicating a barcode to decode, and instead of decoding that barcode, access previously stored decoded barcode data for the barcode and report that data, thereby allowing the barcode reader to avoid scanning and decoding the barcode at the decode region, and avoid on-axis reflection errors.

22 Claims, 12 Drawing Sheets

| 6041,1 | 6041,2 | 6041,3 | 6041,4 |
|---|---|---|---|
| 6042,1 | 6042,2 | 6042,3 | 6042,4 |
| 6043,1 | 6043,2 | 6043,3 /608 | 6043,4 |
| 6044,1 | 6044,2 | 6044,3 | 6044,4 |
| 6045,1 | 6045,2 | 6045,3 | 6045,4 |
| 6046,1 | 6046,2 | 6046,3 | 6046,4 |
| 6047,1 | 6047,2 | 6047,3 | 6047,4 |
| 6048,1 | 6048,2 | 6048,3 | 6048,4 |
| 6049,1 | 6049,2 | 6049,3 | 6049,4 |
| 60410,1 | 60410,2 | 60410,3 | 60410,4 |

FIG. 7

DEVICES AND METHODS FOR READING PICKLISTS

BACKGROUND

Barcodes are commonly used to encode data associated with a variety of items that the barcodes are often printed on or attached thereto. In the past, laser-based barcode readers were employed to read barcode data and thereafter decode the payload. However, with the proliferation of imaging sensors, imager-based barcode readers have become mainstream. These barcode readers typically capture image data associated with the imager's field of view (FOV), and identify and decode barcodes found within the said image data. While being effective in many instances, certain drawbacks can and do exist in these barcode readers.

As one example, barcode readers today can be configured to operate in so-called "picklist" modes. This type of operation is typically desired when a plurality of barcodes is printed on a list, called a picklist, in tight formation. Such formation can be problematic for a reader operating in regular mode as the reader's FOV is likely wide enough to encompass multiple barcodes at once. Hence, the barcode reader can be configured to decode only the barcodes that overlap within the reader's decode region (e.g., a sub-region of the FOV that partially of fully overlaps with an aim-pattern projected on a target). This configuration can allow the user to activate the read operation, move the FOV over the entire picklist, and decode only the specific barcodes of interest until the read operation is terminated. In other instances, the barcode reader can be configured to activate the aiming assembly prior to decoding a barcode of interest and initiate a decode operation upon a subsequent user input. For example, a user may activate the barcode reader via a trigger causing the aiming assembly to emit an aim pattern, navigate to the barcode of interest where the aim pattern would impinge on said barcode, and release the trigger signaling a decode operation of the barcode of interest.

However, in some cases, the aforementioned barcode readers can experience certain drawbacks. For example, picklists can often be found in relatively harsh environments and thus be laminated. Such lamination can create undesired specular reflections, either from the barcode reader's own aiming/illumination systems and/or from external sources like overhead lights, which can negatively impact the ability of the barcode reader to decode a barcode that overlaps with the reader's decode region. Consequently, there continues to be a need for improved devices, methods, and systems that at least address this concern.

SUMMARY

In an embodiment, the present invention is a computer-implemented method for reading a picklist using a barcode reader having a processor and an imaging assembly with a field of view (FOV). The method comprises: capturing, by the imaging assembly, a first image of a first environment appearing within the FOV; decoding, by the processor, each decodable barcode appearing within the first image; capturing, by the imaging assembly, a subsequent image of another environment appearing within the FOV; evaluating, through positional tracking of each of the decodable barcode, whether one of the decodable barcode appears within a decode region of the FOV in the subsequent image; and responsive to detecting the one of the decodable barcode appearing within the decode region, generating a decode signal representative of the one of the decodable barcode appearing within the decode region of the FOV being successfully decoded.

In another variation of this embodiment, the method further includes: sequentially capturing at least one intervening image between capturing the first image and capturing the subsequent image; for each of the at least one intervening image, decoding each new decodable barcode captured within the respective intervening image; for each following image succeeding the each of the at least one intervening image, evaluating, through positional tracking of each of the new decodable barcode and each of the decodable barcode, whether at least one of the new decodable barcode or one of the decodable barcode appears within the decode region of the FOV; and responsive to detecting the at least one of the new decodable barcode or one of the decodable barcode appearing within the decode region, generating a decode signal representative of the at least one of the new decodable barcode or one of the decodable barcode appearing within the decode region being successfully decoded.

In another embodiment, the present invention is a computer-implemented method for reading a picklist using a barcode reader having a processor and an imaging assembly with a field of view (FOV). The method comprises: capturing, by the imaging assembly, a plurality of images in succession, each of the plurality of images capturing a view of an environment appearing with the FOV at a time of capturing the each of the plurality of images; for each of the plurality of images, decoding, by the processor, each decodable barcode newly appearing in a respective each of the plurality of images; evaluating, through positional tracking of each of the decodable barcode, whether one of the decodable barcode appears within a decode region of the FOV in any one of the plurality of images; and responsive to detecting the one of the decodable barcode appearing within the decode region, generating a decode signal representative of the one of the decodable barcode appearing within the decode region of the FOV being successfully decoded.

In a variation of such embodiments, the barcode reader has an aiming assembly configured to project an aim light into the FOV, and the decode region of the FOV is associated with the aim light.

In another variation of such embodiments, the decode region of the FOV is a region within the FOV occupied by the aim light.

In another variation of such embodiments, capturing the first image, decoding each of the decodable barcode, capturing the subsequent image, evaluating whether one of the decodable barcode appears within the decode region, and generating the decode signal, all occur within a single read operation.

In another variation of such embodiments, generating the decode signal representative of the one of the decodable barcode appearing within the decode region of the FOV being successfully decoded occurs irrespective of an ability to successfully decode the one of the decodable barcode appearing within the decode region of the FOV from the subsequent image.

In yet embodiment, the present invention is a barcode reader comprising: a housing; an imaging assembly within the housing and configured to capture a plurality of images in succession, each of the plurality of images capturing a view of an environment appearing with a field of view (FOV) of the barcode reader at a time of capturing the each of the plurality of images; and a processor and memory storing instructions that, when executed, cause the processor to: for each of the plurality of images, decode each decodable barcode newly appearing in a respective each of the plurality of images; evaluate, through positional tracking of each of the decodable barcode, whether one of the decodable barcode appears within a decode region of the FOV in any one of the plurality of images; and responsive to detecting the one of the decodable barcode appearing within the decode region, generate a decode signal representative of the one of the decodable barcode appearing within the decode region of the FOV being successfully decoded.

In yet embodiment, a barcode reader comprising: a housing; an imaging assembly within the housing and configured to a first image of a first environment appearing within the field of view of the barcode reader; and a processor and memory storing instructions that, when executed, cause the processor to: decode each decodable barcode appearing within the first image; instruct the imaging assembly to capture a subsequent image of another environment appearing within the FOV; evaluate, through positional tracking of each of the decodable barcode, whether one of the decodable barcode appears within a decode region of the FOV in the subsequent image; and responsive to detecting the one of the decodable barcode appearing within the decode region, generate a decode signal representative of the one of the decodable barcode appearing within the decode region of the FOV being successfully decoded.

BRIEF DESCRIPTION OF THE DRAWINGS

The accompanying figures, where like reference numerals refer to identical or functionally similar elements throughout the separate views, together with the detailed description below, are incorporated in and form part of the specification, and serve to further illustrate embodiments of concepts that include the claimed invention, and explain various principles and advantages of those embodiments.

FIGS. 6-8 illustrate example picklists and showing environments captured as images by the barcode reader of FIG. 1 implementing example methods and/or operations described herein.

Figure 1:
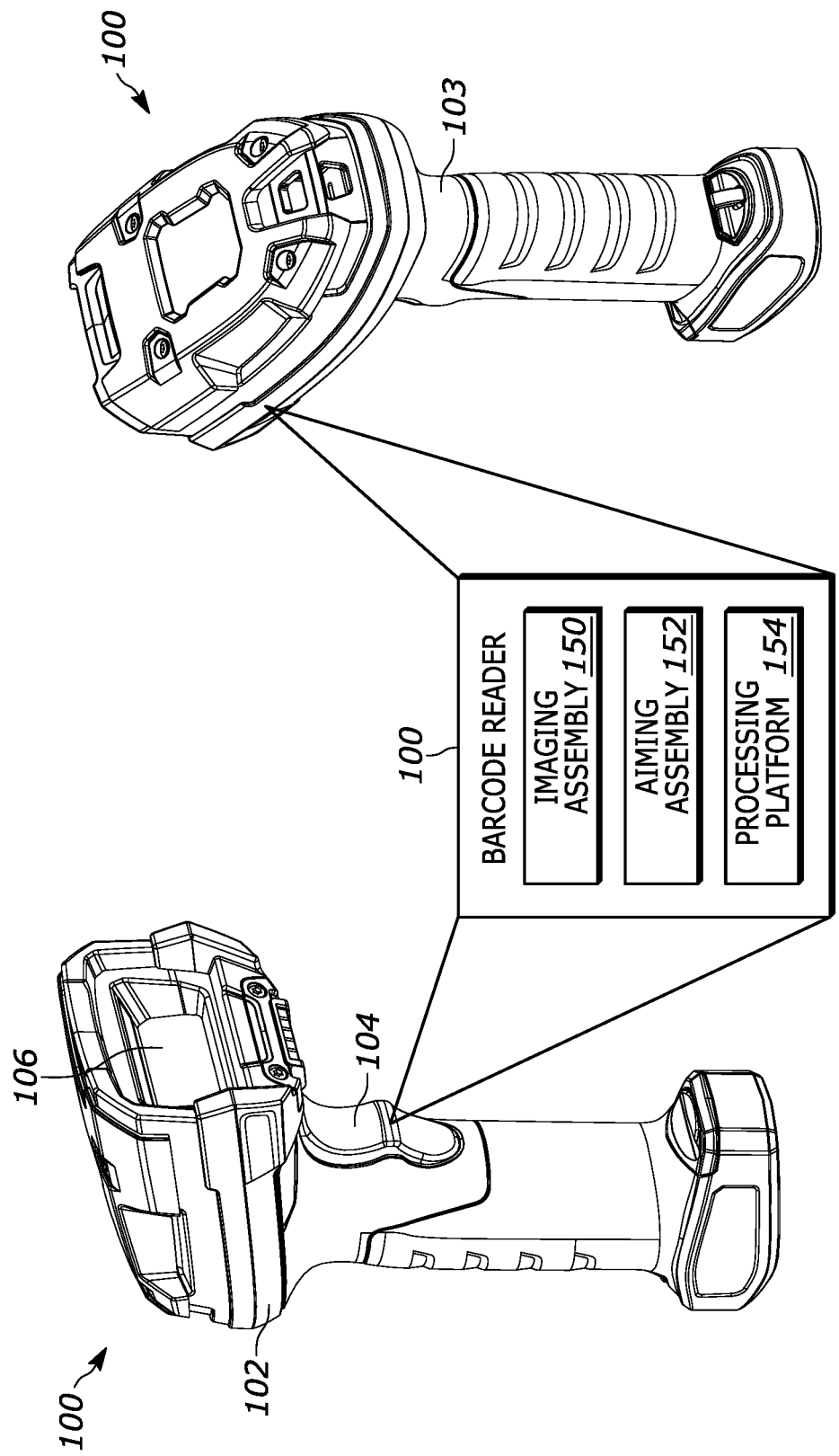
FIG. 1 illustrates a barcode reader for implementing example methods and/or operations described herein.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the present invention.

The apparatus and method components have been represented where appropriate by conventional symbols in the drawings, showing only those specific details that are pertinent to understanding the embodiments of the present invention so as not to obscure the disclosure with details that will be readily apparent to those of ordinary skill in the art having the benefit of the description herein.

DETAILED DESCRIPTION

In various embodiments of the present disclosure, a method, and related systems and devices, are described for reading a picklist. In various embodiments, a method includes capturing a first image within the field of view (FOV) and decoding the payload each decodable barcode appearing within the first image, irrespective of where the barcode appears in that image. In some embodiments, the method further includes capturing subsequent images within the FOV and evaluating those images, e.g., using positional tracking, to determine whether a barcode that has already been decoded appears within a decode region of the FOV. Responsive to such detection, in some embodiments, the method will then generate a decode signal representative the payload of the decodable barcode appearing within the decode region, which the method may do by accessing previously decoded and stored barcode data. In this way, in various embodiments, the method can avoid having to decode the decodable barcode within the decode region, which is useful for many reasons, including to avoid reflection errors that can plague barcodes in the decode region.

In various other embodiments, a method includes capturing a plurality of images in succession and decoding each decodable barcode that newly appears in each image. In some embodiments, the method further evaluates each image, e.g., using positional tracking, to determine whether a decodable barcode appears within a decode region of the FOV, and if so, generating a decode signal representative of that decodable barcode appearing within the decode region of the FOV.

In various embodiments, barcode readers configured to perform such methods are provided as well.

FIG. 1 is an illustration of an example barcode reader 100 capable of implementing operations of the example methods described herein, as may be represented by the flowcharts of the drawings that accompany this description. In the illustrated example, the barcode reader 100 includes a housing 102 with a handle 103 having a trigger 104 on an interior side of the handle.

In various embodiments, the barcode reader 100 is configured to have a picklist mode that is activated by selecting a picklist mode and loading picklist mode operating conditions into the barcode reader 100. In some examples, the picklist mode is entered by the operator scanning a particular picklist start barcode by pulling the trigger 104. In response to decoding the picklist start barcode, the barcode reader 100 executes an instruction according to the payload, that instruction enters the barcode reader 100 into the picklist mode and loads any picklist operating conditions stored in memory. In other examples, the user may select a picklist mode through an input on the barcode reader, such as through touchpad, touch display, dedicated picklist button, or other input means. Indeed, in various embodiments, the barcode readers herein may be implemented as portable electronic mobile computers, for example, having a tablet PC form factor, or mobile handheld device form factor. In some such embodiments, the user may be presented with a graphical user interface that includes a selectable icon that enters the device into a picklist mode upon selection.

In various embodiments, the picklist operating conditions may include properties of the picklist, such as the number of barcodes on the picklist and the types of barcodes on the picklist. In various embodiments, the picklist operating conditions include operating properties of the barcode reader 100, such as conditions for entering and exiting the read operation state and particular schemes for indicating a successful decode of a barcode.

In any event, in the illustrated example, the barcode reader 100, in the picklist mode, enters into a read operation state for example, by the pulling the trigger 104 to scan barcodes. In some examples, the barcode reader 100 is maintained in the read operation state as long as the trigger 104 is depressed, while in the other examples the read operation state is entered with a first trigger pull and exited with a subsequent trigger pull. Thus, in some examples, the read operation may involve a single event trigger. In yet other examples, the read operation may be initiated by two or more events. For example, in some instances, the barcode reader 100 is configured to enter the read operation state by an operator first pulling the trigger 104 and then moving the barcode reader 100 such that an aiming pattern generated by the aiming assembly 152 impinges on a barcode of interest, placing the barcode of interest within the decode region of the barcode reader. Subsequent to positioning the barcode of interest within the decode region, the trigger 104 is released causing the barcode reader to transmit a decode signal indicating a successful decode of just the barcode of interest and not of any other barcodes that may have come into the FOV of the barcode reader since the initial activation of the trigger 104 and the subsequent navigation through the picklist. In this way, detection of the barcode at a decode region and release of an engaged trigger completes the read operation of the barcode reader. Such configuration allows for a capture of a specific barcode within a picklist without inadvertent reading of unintended barcodes.

The housing 102 further includes a scanning window 106 through which the barcode reader 100 illuminates a target such as a picklist for decoding a barcode on the target. As used herein, reference to barcode includes any indicia that contains decodable information and that may be presented on or within a target, including by not limited to, a one dimension barcode, a two dimension barcode, a three dimension barcode, a four dimension barcode, a QR code, a direct part marking (DPM), etc.

In the illustrated example, the barcode reader 100 includes an imaging assembly 150 configured to capture an image of a target, in particular a barcode on the target. The barcode reader 100 further includes an aiming assembly 152 configured to generate an aiming pattern, e.g., dot, crosshairs, line, rectangle, circle, etc., that impinges on the target. The barcode reader 100 further includes a processing platform 154 configured to interface with the imaging assembly 150, the aiming assembly 152, and other components of the barcode reader 100 to implement operations of the example methods described herein, including those as may be represented by the flowcharts of the drawings such as FIGS. 4 and 5. In some embodiments, barcode readers herein may include other systems, such as an illumination assembly.

Figure 2A:
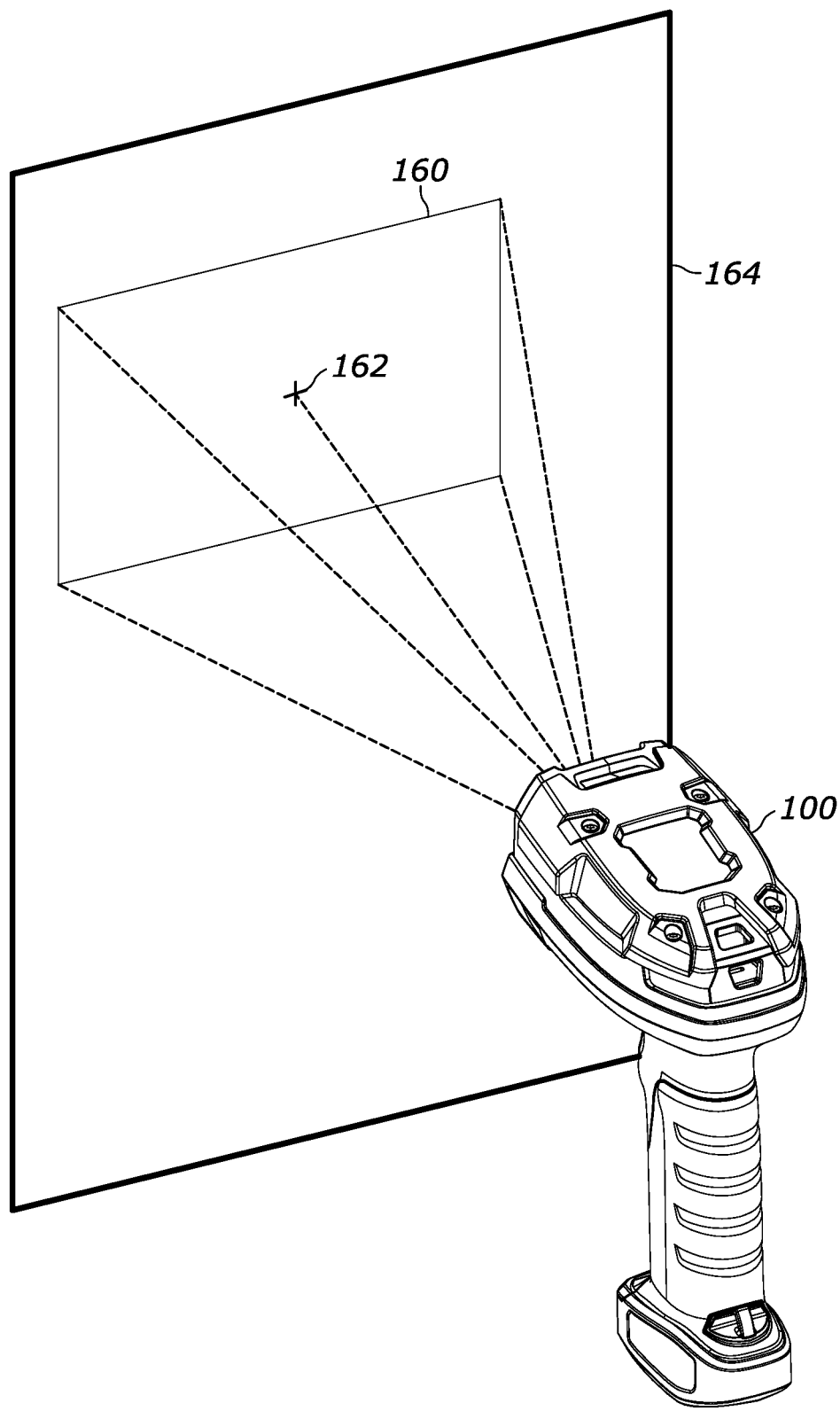
FIGS. 2A-2E illustrate various examples of operation of the barcode reader of FIG. 1 in a picklist mode for implementing example methods and/or operations described herein.
Figure 2B:
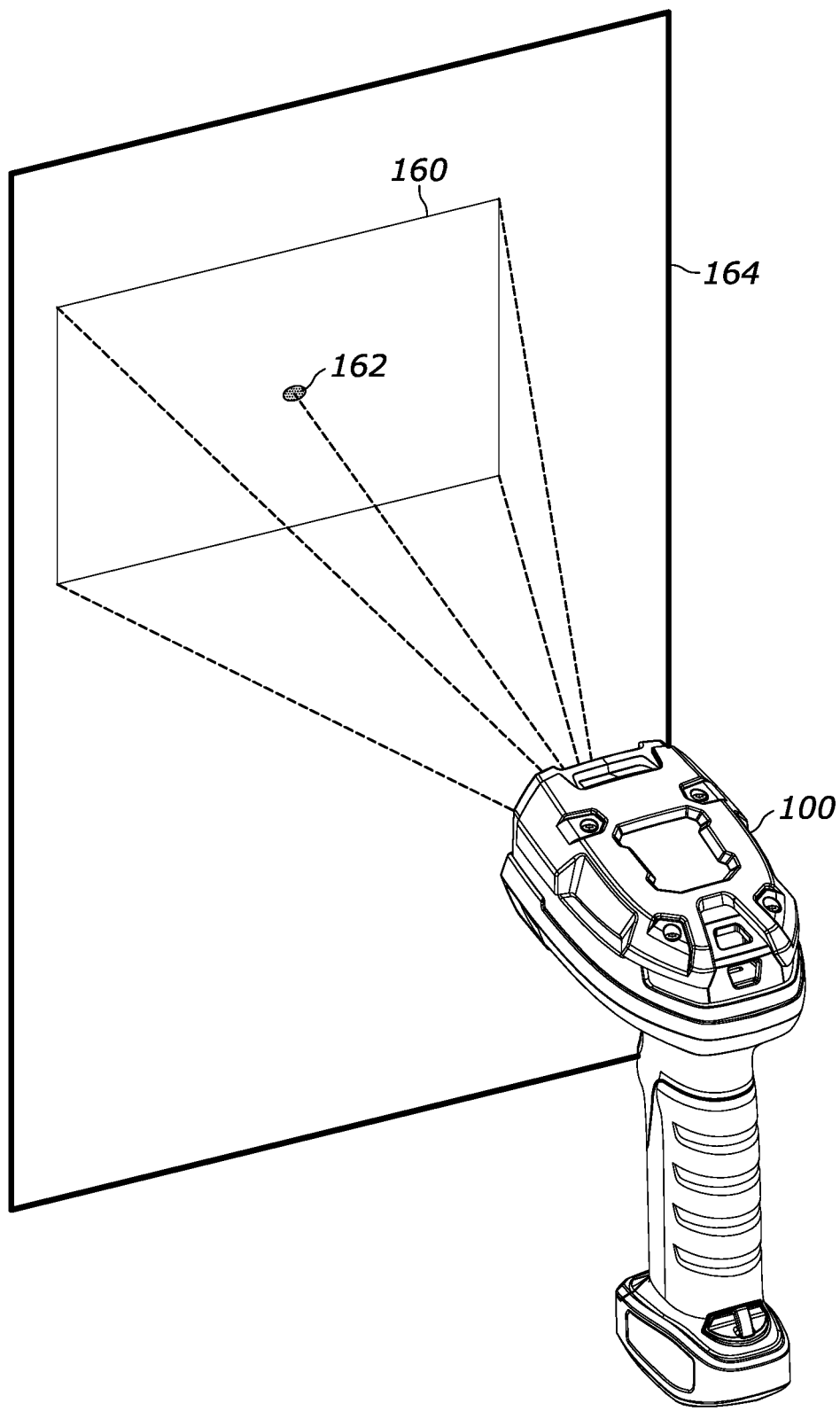

FIGS. 2A-2E illustrate various operations of the barcode reader 100, in accordance with different implementations of the techniques herein. In FIG. 2A, the barcode reader 100 is shown operated in a picklist mode and showing a FOV 160 that sets the bounds for an environment that can be captured by the imaging apparatus 150, positioned at the illustrated distance away from a target 164. In the illustrated example, the aiming assembly 152 has generated an aiming pattern 162, which may be any visually desirable pattern that can serve to visually identify predefined region(s) of the FOV. In the illustrated examples shown in FIG. 2A and FIG. 2B, the pattern is illustratively shown as a crosshair and as a dot, respectively. In various embodiments, the aiming pattern 162 is centered within the FOV 160 and will impinge a target 164 positioned in the center an environment captured as an image by the barcode reader 100.

Figure 2C:
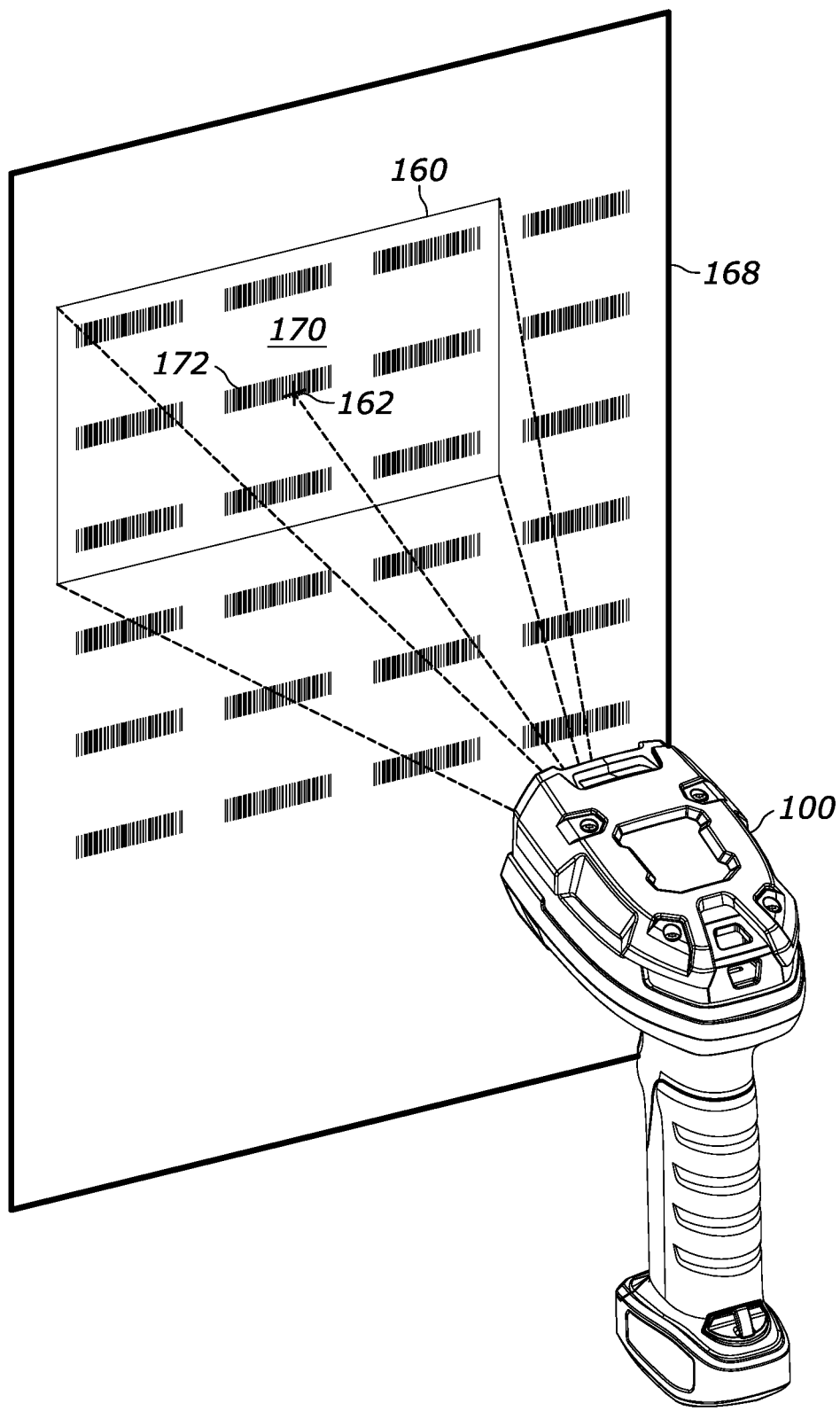

In various embodiments, the barcode reader 100 scans a picklist containing barcodes in a tabled format across the picklist. FIG. 2C illustrates the barcode reader 100 in a picklist mode, and in particular a read operating state for scanning barcodes of a picklist 168. In the illustrated example, the barcode reader 100 is directed at the picklist such that the FOV 160 coincides with an initial environment 170 (to be captured by the barcode reader 100 implementing the techniques herein) in an upper left corner of the picklist 168. The FOV 160 is positioned such that aiming pattern 162 is impinging on the picklist 168 at a barcode 172, thereby indicating that the barcode 172 is to be decoded and a decode signal including its decoded barcode data is to be sent to a remote system, such as an inventory management system, payment processing system, theft prevention system, or other network-accessed system or network accessible server.

Figure 2D:
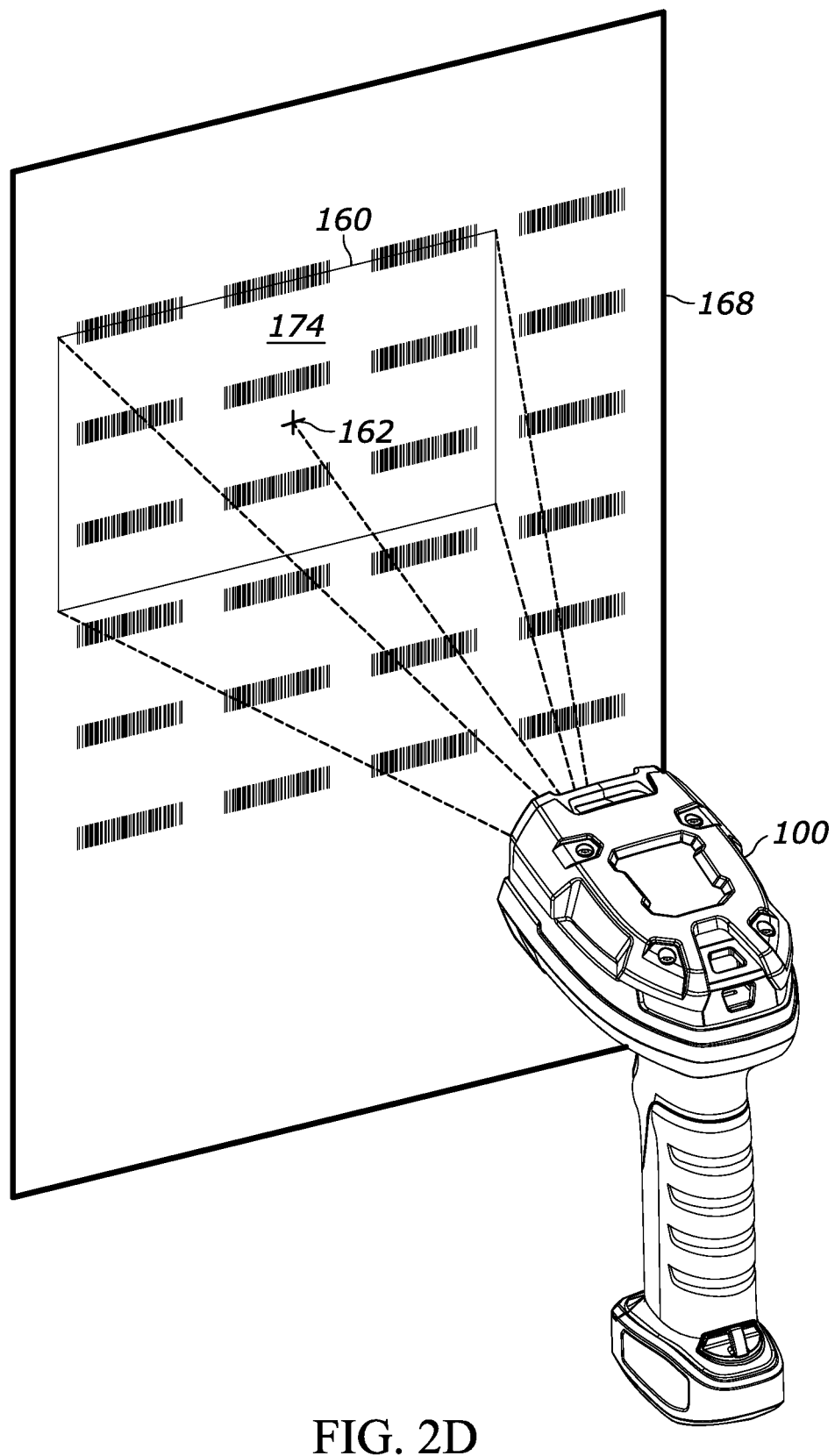
Figure 2E:
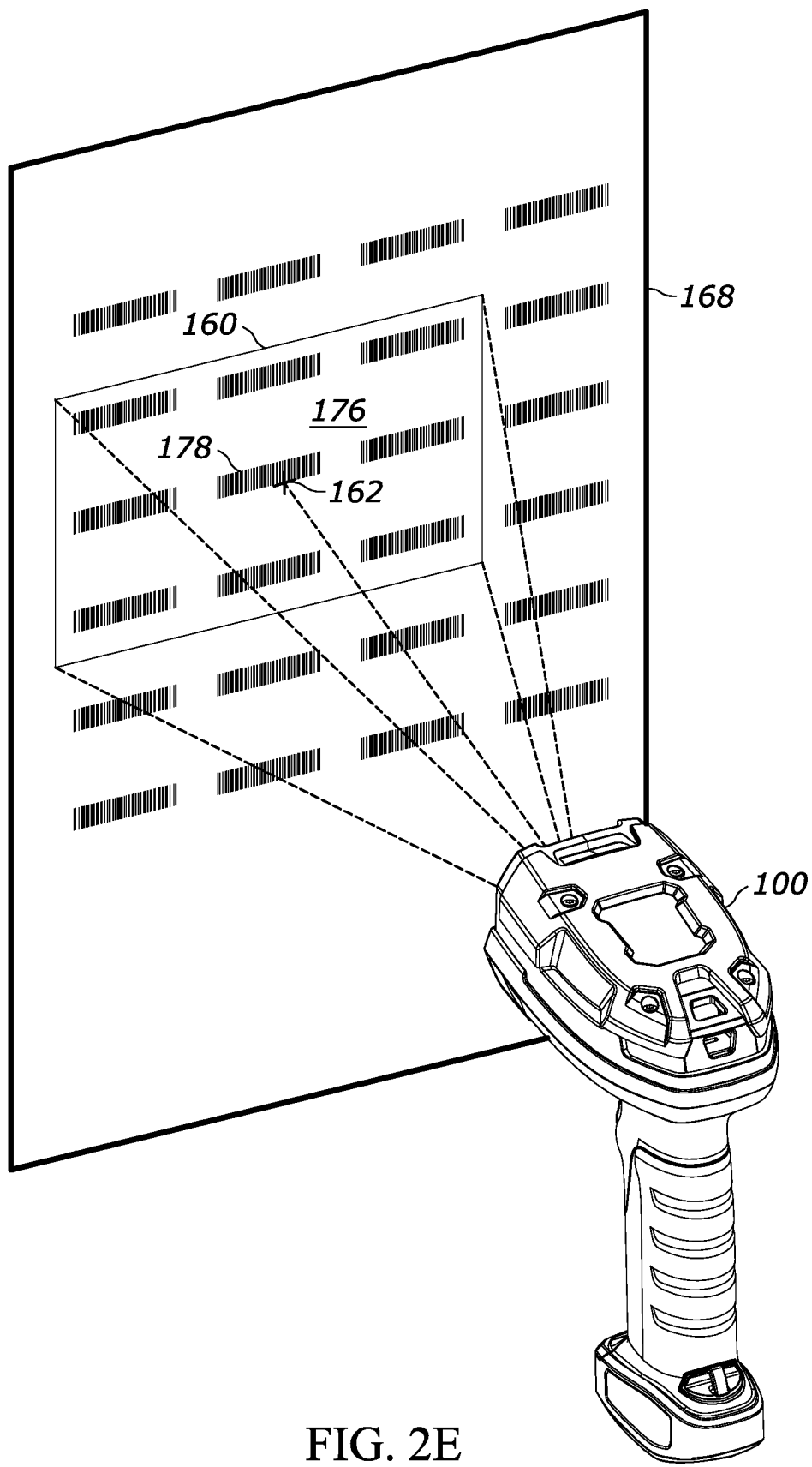

When in the read operating state of the picklist mode, the operator will move (also termed painting the picklist) the barcode reader 100 to move the FOV 160 over the picklist 168, with the imaging assembly 150 capturing images of different environments throughout that movement. FIG. 2D illustrates the FOV 160 shifted downward from the position shown in FIG. 2C, indicating that the operator has moved the barcode reader 100 downward, and the barcode reader 100 captures an image of new environment 174. FIG. 2E illustrates the FOV 160 after further shifting downward from the position shown in FIG. 2D, and the barcode reader 100 captures an image of a new environment 176. Notably, the aiming pattern 162 in FIG. 2D does not impinge on any of the barcodes of the picklist 168, i.e., no barcode is in a decode region of the FOV 160 of the barcode reader 100. In FIG. 2E, however, the aiming pattern 162 has moved far enough down the picklist 168 so that the aiming pattern 162 impinges on barcode 178 is in a decode region of the FOV, indicating that there is to be a transmission of the barcode 178 upstream to a remote server.

In various embodiments, the decode region presents a region of the FOV of the barcode readers herein. The decode region also referred to as a decode-reporting region) is used to determine whether a barcode is identified for decoding and transmission of that barcode's payload. In some embodiments, the decode region is the region of the FOV that is illuminated by an aiming pattern. In some embodiments, the decode region is a region that is partially illuminated by an aiming pattern and extends to cover portions of the FOV that are in near proximity to the aiming pattern. In some embodiments, the decode region can be a bounding box defined by at least some portions (e.g., most extreme edges) of the aiming pattern. The decode region may take on different shapes, including, but not limited to, square, circular, rectangular, elliptical, and/or conforming to the appearance of the aiming pattern as projected on the target. More particularly, the decode region can represent a portion of the pixels of a photodetector of the imaging assembly 150, such as pixels in a central region of the photodetector that capture light from the predefined region of the FOV.

Figure 3:
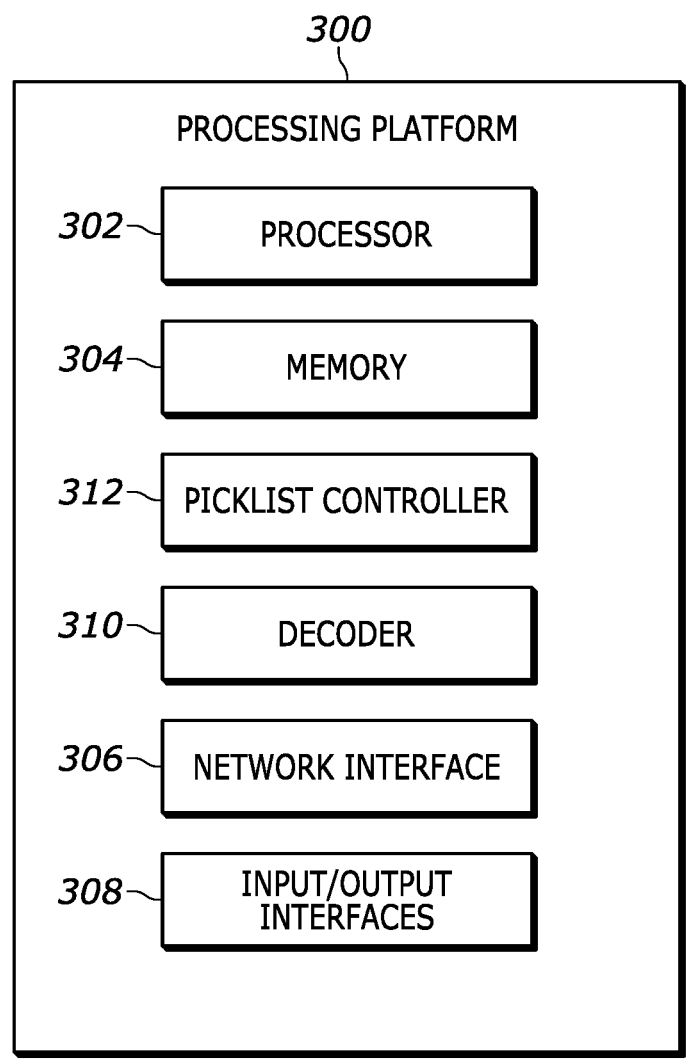
FIG. 3 is a block diagram of an example logic circuit in the form of a processing platform as may be in the barcode reader of FIG. 1 for implementing example methods and/or operations described herein.

FIG. 3 is a block diagram representative of an example logic circuit capable of implementing, for example, one or more components of the example barcode reader 100 of FIGS. 1 and 2A-2E or, more generally, the example processing platform 154 of FIG. 1. The example logic circuit of FIG. 3 is a processing platform 300 capable of executing instructions to, for example, implement operations of the example methods described herein, as may be represented by the flowcharts of the drawings that accompany this description, including those of FIGS. 4 and 5. Other example logic circuits capable of, for example, implementing operations of the example methods described herein include field programmable gate arrays (FPGAs) and application specific integrated circuits (ASICs).

The example processing platform 300 of FIG. 3 includes a processor 302 such as, for example, one or more microprocessors, controllers, and/or any suitable type of processor. The example processing platform 300 of FIG. 3 includes memory (e.g., volatile memory, non-volatile memory) 304 accessible by the processor 302 (e.g., via a memory controller). The example processor 302 interacts with the memory 304 to obtain, for example, machine-readable instructions stored in the memory 304 corresponding to, for example, the operations represented by the flowcharts of this disclosure. Additionally or alternatively, machine-readable instructions corresponding to the example operations described herein may be stored on one or more removable media (e.g., a compact disc, a digital versatile disc, removable flash memory, etc.) that may be coupled to the processing platform 300 to provide access to the machine-readable instructions stored thereon.

The example processing platform 300 of FIG. 3 also includes a network interface 306 to enable communication with other machines via, for example, one or more networks. The example network interface 306 includes any suitable type of communication interface(s) (e.g., wired and/or wireless interfaces) configured to operate in accordance with any suitable protocol(s).

The example processing platform 300 of FIG. 3 also includes input/output (I/O) interfaces 308 to enable receipt of user input and communication of output data to the user.

The processing platform 300 of FIG. 3 further includes a decoder 310 and a picklist controller 312, both of which may be configured to perform operations represented by the flowcharts and other processes of this disclosure as described herein. The decode 310, for example, may be configured to decode indicia captured in images captured by the barcode imager, such as the imaging assembly 150 of FIG. 1.

In various embodiments, the picklist controller 312 is coupled to the barcode imager, such as in the imaging assembly 150 of FIG. 1, and the decoder 310 and the memory 304 (e.g., via a memory controller and/or circuit bus) and configured to control a picklist mode and read operating state of the barcode reader. For example, in various embodiments, the picklist controller 312 is configured to control the barcode reader to read barcodes within an environment appearing within the FOV, decode the payloads of each of the decodable barcodes in that that environment, store those payloads, and track the location of the decodable barcodes. In various embodiments, the picklist controller 312, in the read operating state, is configured to continually capture subsequent images of another environment appearing within the FOV. In various embodiments, the picklist controller 312 is configured to evaluate those subsequent images, determine if previously-undecoded, but decodable barcodes are present in those subsequent images, and, if so, decode those previously previously-undecoded, but decodable barcodes. In various embodiments, the picklist controller 312 is configured to determine when a barcode appears within a decode region of the FOV and determine if the barcode is one that has been previously decoded. If so, instead of decoding the barcode appearing within the decode region, the picklist controller 312 may optionally access the previously-stored decode data for that barcode and transmit that decode data (e.g., the decoded indicia) to an external system through the network interface 306.

In this way, in various embodiments, the picklist controller 312 may be configured to decode barcodes in a picklist, in the background, (e.g., while the barcode reader is scanning over the picklist), and store the resulting decoded barcode data for access and use later. Such operation allows the barcode reader to avoid situations where a picklist barcode, aligned for decoding, is not sufficiently visible because of bright reflection or other imaging anomalies that can plague barcode readers in picklist mode. Such operation further allows configuring barcode reader operation in new ways. For instance, in some cases where in the picklist mode the barcode reader is capturing all barcodes of interest (the operator is painting the picklist), to avoid specular reflection from the aiming assembly the aim light source is periodically blinked, particularly during the capture of frames used for decode operations. In other words, the aim light is turned off during the capture of a frame that is used to locate and decode a barcode. In some instances (e.g., when the imager is operating at 60 frames per second), this can mean that the aim light is turned on and off 30 times per second and the imager is only able to capture 30 effective frames per second. The apparent detriment of this is that a flicker rate of 30 times per second is below the typical flicker fusion threshold and such flicker can be perceived by the operator as annoying or uncomfortable. Moreover, such operation effectively causes the imager to operate at half its operational capacity, 30 fps as opposed to 60 fps. Utilizing the techniques described herein can help avoid the aforementioned deficiencies. That is, in some implementations, the aiming light can be kept in the 'on' state while the imaging assembly detects when portions of the barcode overlap with the decode region (by, for example, detecting that the barcode is impinged by the aiming pattern by, for example, determining when pixels of the imaging assembly that coincide with the decode region capture the portions of barcode) and determines if the barcode payload has been previously decoded, without needing to put the aiming assembly in the 'off' state. Since it is likely that the barcode will have been decoded prior to appearing within the decode region, subsequent obscuration of the barcode due to a specular reflection will not have an effect on the transmission of the decode signal so long as the previously decoded barcode can be tracked until it comes into contact with the decode region. Such functionality can allow for utilization of, for example, a 60-fps imaging sensor where the sensor can effectively operate at 60 fps and where the aiming pattern lacks the annoying or disruptive flicker.

Figure 4:
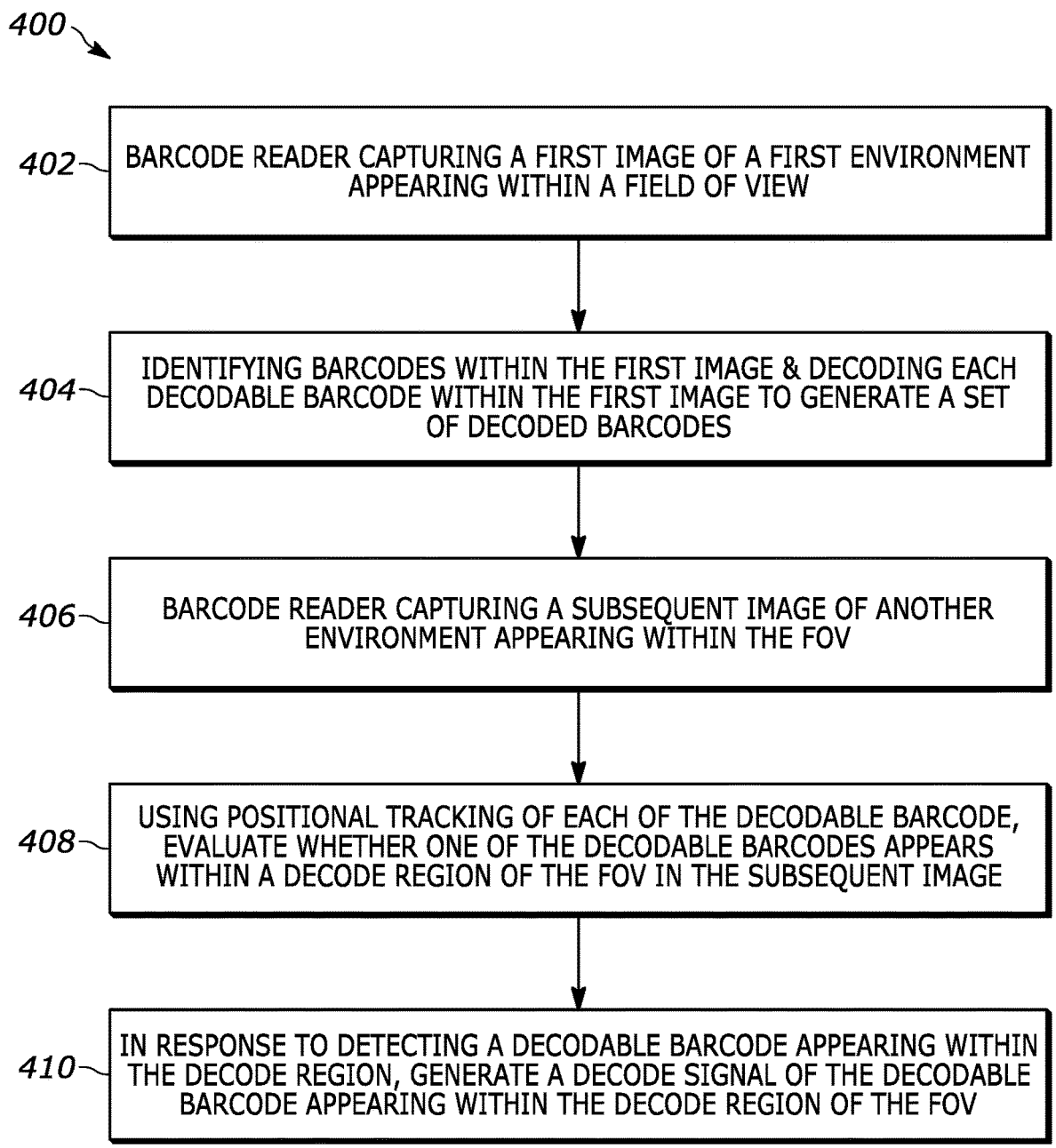
FIG. 4 is a process diagram of an example method as described herein.
Figure 6:
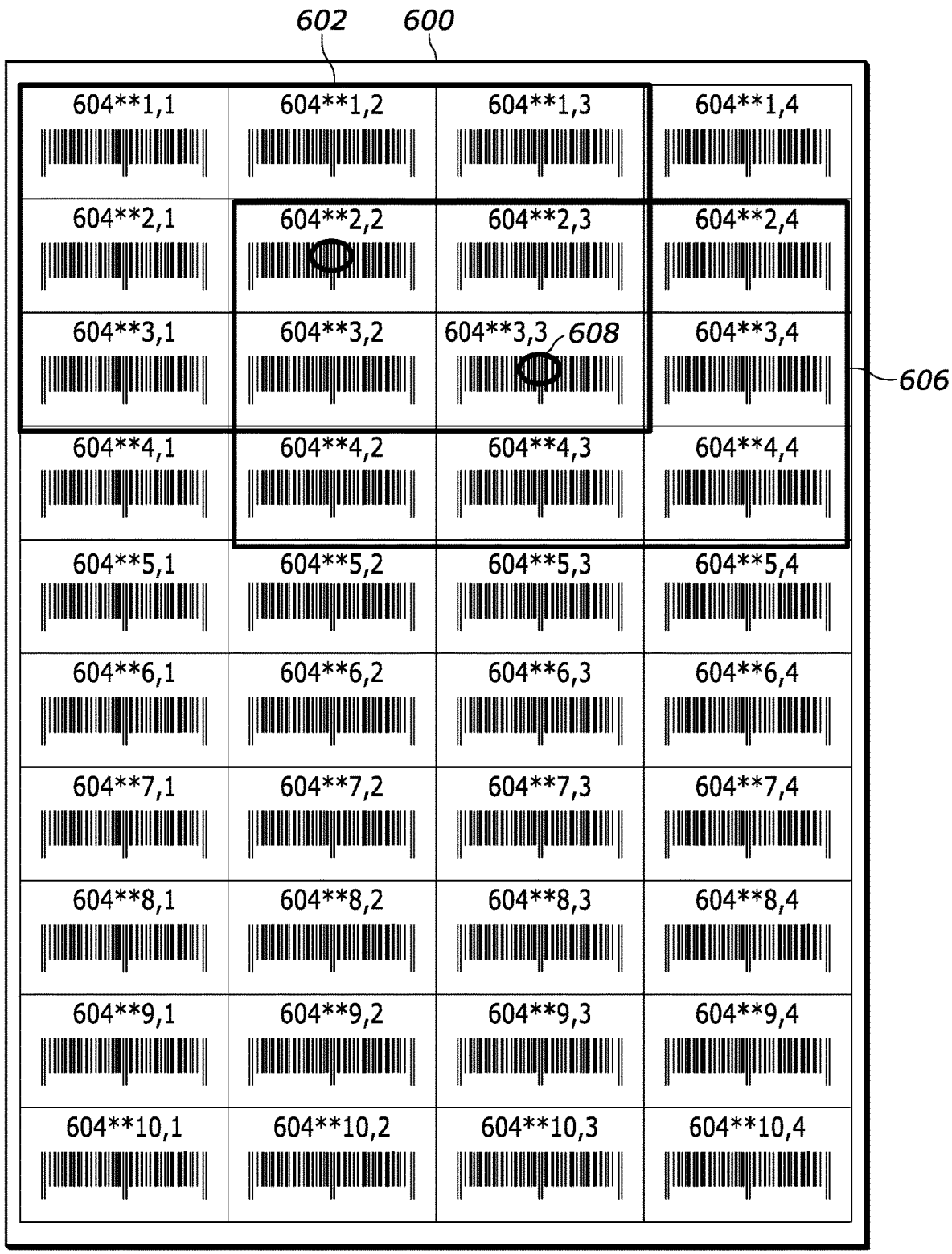

FIG. 4 is a block diagram of an example process 400 for reading a picklist using a barcode reader as may be performed by the barcode reader 100 of FIGS. 1 and 2A-2E, and the processing platform 300 of FIG. 3. Initially, at a process 402, the barcode reader captures a first image of a first environment appearing within a FOV. Referring to FIG. 6, this first image may be a first environment 602 of a picklist 600 that contains a plurality of barcodes $604_{1,1}$ through $604_{10,4}$. In the illustrated example of FIG. 6, the first environment 602 includes nine (9) barcodes, $604_{1,1}$, $604_{1,2}$, $604_{1,3}$, $604_{2,1}$, $604_{2,2}$, $604_{2,3}$, $604_{3,1}$, $604_{3,2}$, and $604_{3,3}$.

To allow for decoding of barcodes within the first environment 602, at process 404, the processing platform 300 of the barcode reader identifies the barcodes within the first environment 602 and decodes the payload of each decodable barcode (also referred to herein as decode the barcode). For example, in various embodiments, at the process 404, the processing platform 300 identifies the barcodes within the FOV and checks memory 304 to determine if the barcode has been previously decoded. Barcodes that appear in an environment of the FOV but have not been previously decoded may be identified as newly appearing decodable barcodes. In other examples, the processing platform 300 may perform further analysis to identify decodable barcodes, such as performing imaging analysis to determine if the barcode is completely within the environment, if the barcode is sufficiently in focus, if the barcode is obscured, etc. Simply put, the imaging assembly needs to capture the barcode with sufficient information to decode the payload in the barcode. At the process 404, the processing platform decodes the payload of the barcodes to generate decoded barcode data that is stored in the memory 304, for example, stored in a data table. If decoded barcode data has been already stored, e.g., if a barcode data table already exists, then any new decoded barcode data may be appended to and stored in memory with that previous data.

To allow for fast operation in the picklist mode, the process 404 tracks, using positional tracking, the decodable barcodes identified within the environment. In various embodiments, that positional tracking is achieved using motion tracking techniques where the position of each decodable barcode is tracked as the barcode reader and thus its FOV scans across the target. By using positioning tracking in this manner, the position of each decodable barcode is tracked over the photodetector the imaging assembly 150, where the imaging assembly tracks on pixel basis the location of the barcode. This is an example of photodetector-based tracking. In various embodiments, the imaging assembly 150 can maintain tracking of the decodable barcode so long as a portion of the barcode is captured by pixels of the photodetector. In various embodiments, if a barcode is no longer captured by pixels of the photodetector, then upon subsequent capture of that barcode by pixels, the imaging assembly 150 will treat the barcode as a newly appearing barcode and determine if its payload has been previously decoded or not performs the processes herein in response accordingly. In some examples, each barcode is individually tracked. In other examples, barcodes may be tracked individually by their relative positioning to one another is also tracked. In this way, even if a first barcode is no longer captured by pixels of the photodetector, so long as another barcode whose position relative to that first barcode is still being tracked by the photodiode, the barcode reader may retain positional information on that first barcode.

In various other embodiments, positional tracking may be achieved using target-based tracking, where the position of the decodable barcodes is tracked relative to the position of the target. For the barcode $604_{1,1}$, for example, such positional tracking may include storing positional information upon decoding the barcode $604_{1,1}$, in particular the positional coordinate 1,1, representing column 1, row 1, of the barcode. For example, the positional information for any barcode may be determined by the processing platform 300 identifying a marker on the picklist 600 indicating an initial position of the picklist, such as an upper left corner, upper right corner, lower left corner, or lower right corner.

In the illustrated embodiment, at a process 406, the barcode reader captures a subsequent image of another environment appearing with the FOV of the barcode reader. Referring to the example of FIG. 6, a captured, second environment 606 is shown having nine (9) barcodes that are collectively different that the nine (9) barcodes of the environment 602. Specifically, environment 606 has barcodes $604_{2,2}$, $604_{2,3}$, $604_{2,4}$, $604_{3,2}$, $604_{3,3}$, $604_{3,4}$, $604_{4,2}$, $604_{4,3}$, and $604_{4,4}$. At a process 408, the processing platform 300, using the positional tracking of each of the barcodes in the environment 606, determines if any decodable barcode is in a decode region of the environment 606. In the example of FIG. 6, decode region 608 of the FOV (e.g., pixels of the photodetector corresponding to where an aiming pattern impinges on the environment) captures a portion of environment 606 that impinges on barcode $604_{3,3}$. In various embodiments, the process 408 using positional tracking, such as motion tracking, determines if any portion of a tracked decodable barcode is detected by the pixels of the decode region 608. In response to detecting the barcode $604_{3,3}$ at that decode region 608, at the process 410, the processing platform 300 generates a decode signal, having the decode barcode data, for that decodable barcode $604_{3,3}$.

In some examples, the process 410 generates the decode barcode signal by determining if the barcode at the decode region has been previously decoded, for example at the process 404. In the illustrated example of FIG. 6, the barcode $604_{3,3}$ had been previously decoded at the process 404, therefore, at the process 410, the processing platform 300 may generate the decoded barcode signal by accessing the stored data in the memory 304. In this way, the processing platform 300 can avoid decoding the barcode $604_{3,3}$, upon detecting it at the decode region 608, resulting in faster provision of the barcode data. Furthermore, by providing previously stored barcode data, the processing platform 300 need not attempt to decode the barcode $604_{3,3}$ when at the decode region, thereby avoiding the possibility of reflection obscuration that can occur at the decode region 608, from specular reflections due to obscuration sources. FIG. 7, for example, illustrates the picklist 600 of FIG. 6, and an environment 606' similar to environment 606, but where the barcode $604_{3,3}$ is obscured, for example, due to the reflections from the aiming pattern generated by the aiming assembly 152. Therefore, although the barcode $604_{3,3}$ is not decodable in the example of FIG. 7, the processing platform 300 is nonetheless able to detect when the barcode $604_{3,3}$ impinges the decode region 608, thereby indicating that the barcode is be decoded, and produce the decoded barcode data and generate a barcode decode signal with that data.

In various embodiments, generating (at process 410) the decode signal from a previously-stored decoded barcode data occurs irrespective of an ability to successfully decode the barcode appearing within the decode region 608.

In various other examples, at the process 410, the processing platform 300 first may attempt to decode the barcode impinging on the decode region 608. And if successful, the process 410 generates the decode barcode signal; and if not successful, the process 410 accesses any previously-stored barcode data (i.e., decode payload) for the barcode, and generates that previously-stored data.

In various embodiments, the process 400 is performed during a single read operation of the picklist mode, where the barcode reader is to scan across the entire picklist, e.g., the picklist 600, until each barcode is decoded and a decode signal generated for each barcode.

In various embodiments, the process 400 is a continuous process that continually captures subsequent images and processes them according to processes 402-410, until the last barcode of the picklist is decoded or until the read operation is terminated on the barcode reader. In some such embodiments, the read operation can be selected and terminated through releasing the trigger on the barcode reader, respectively.

In various embodiments, the processing platform 300 is further configured to sequentially capture at least one intervening image between capturing the first image at process 402 and capturing the subsequent image at process 406. In some such embodiments, the process platform 300 is configured, for each of the at least one intervening image, to decode each new decodable barcode captured within the respective intervening image and perform positional tracking on the decodable barcode. Furthermore, in some embodiments, for each following image, the processing platform 300 is configured to evaluate, through positional tracking of each of the new decodable barcode and each of the decodable barcode, whether at least one of the decodable barcodes appears within the decode region of the FOV. Furthermore, responsive to detecting that at least one of the decodable barcodes appears within the decode region, the processing platform 300 is configured to generate a decode signal representative of the payload of that barcode.

Figure 5:
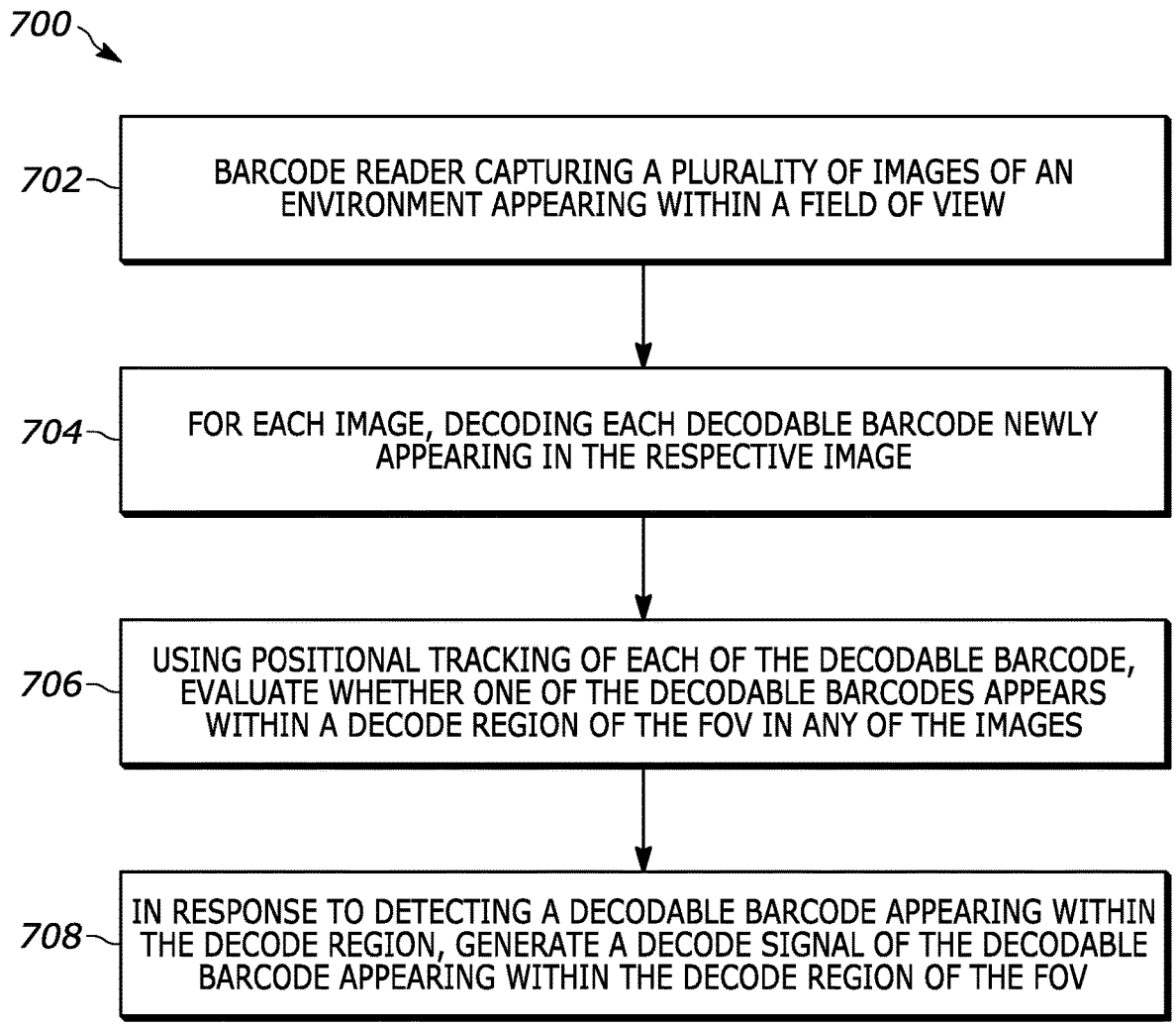
FIG. 5 is a process diagram of another example method as described herein.

FIG. 5 is a block diagram of another example process 700 for reading a picklist using a barcode reader as may be performed by the barcode reader 100 of FIGS. 1 and 2A-2E, and the processing platform 300 of FIG. 3. Initially, at a process 702, the barcode reader captures a plurality of images of environments appearing within a FOV of the barcode reader. In an embodiment, as the barcode reader scans across the picklist, for example, the imager, such as the imaging assembly 150 of FIG. 1, continually captures images of the picklist. At a process 704, for each image captured, the processing platform 300 identifies any decodable barcodes that newly appear in the image. In an embodiment, the process 704 identifies the barcodes within an image and then determines using positional tracking information if the barcodes have been decoded before. Any barcode that has not been decoded before, and that is decodable, will be decoded at the process 704.

In various embodiments, decodable barcodes are all barcodes within an image of the environment, that are not located at a decode region of that environment. In various embodiments, decodable barcodes include sufficient barcode data within the image of the environment to allow for decoding of the barcode.

Figure 8:
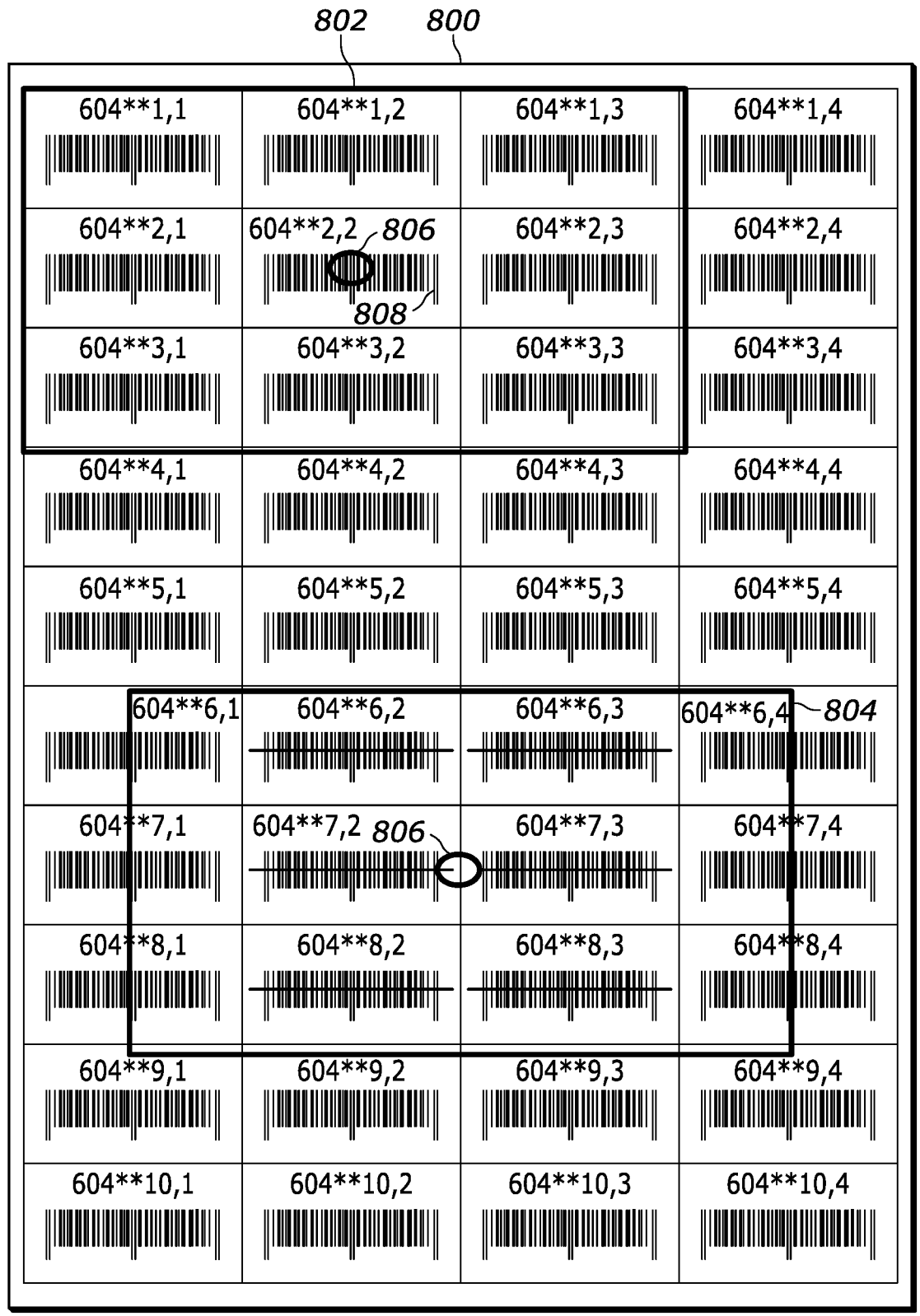

At a process 706, the processing platform 300, using positional tracking for each of the decodable barcodes in an image, evaluates whether one of the decodable barcodes impinges the decode region of the FOV, e.g., the decode region 608 in FIG. 6. In response to detecting a decodable barcode appearing with a decode region, at the process 708, the processing platform 300 generates a decode signal of the decodable barcode, e.g., in a similar manner to that of process 410, in FIG. 4. If no decodable barcode appears within the decode region of the FOV, then the process 700 continues to capture images of environments as the barcode reader scans over the picklist. Turning to FIG. 8, for example, a picklist 800 is shown with an image of a first environment 802 and an image of a second environment 804. In the first environment 802, a decode region 806 of the FOV impinges on a barcode 808. In the second environment 804, the decode region 806 does not impinge on any barcode, that is none of the pixels defining the decode region 806 capture a portion of a barcode in the environment 804.

In various embodiments, processes 410 and 708 further include removing from memory decoded barcode data in response to that data being communicated as the generated decode signal. For example, the picklist 800 in FIG. 8, illustrates 6 barcodes that are shown crossed out, which is shown for visualization purposes only. The crossed-out barcodes represent decodable barcodes that were previously decoded and their decoded barcode data was used to generate a successful decode signal of processes such as processes 410 or 708. The crossed-out visualization is to show that these barcodes have already been decoded and reported during the picklist mode of a barcode reader and therefore, in the illustrated example, are no longer stored in the memory 304. Instead, in some embodiments, the memory 304 stores a flag or other data indication that the barcode at the corresponding position has been reported.

In some examples, the barcode reader may be configured to give a visual indication to the user that a barcode on a picklist has already been decoded and the corresponding decoded barcode data sent to a remote device. For example, such visualization can occur by altering the aiming pattern generated by the aiming assembly, such as the aiming assembly 152 of FIG. 1.

The above description refers to a block diagram of the accompanying drawings. Alternative implementations of the example represented by the block diagram includes one or more additional or alternative elements, processes and/or devices. Additionally or alternatively, one or more of the example blocks of the diagram may be combined, divided, re-arranged or omitted. Components represented by the blocks of the diagram are implemented by hardware, software, firmware, and/or any combination of hardware, software and/or firmware. In some examples, at least one of the components represented by the blocks is implemented by a logic circuit. As used herein, the term "logic circuit" is expressly defined as a physical device including at least one hardware component configured (e.g., via operation in accordance with a predetermined configuration and/or via execution of stored machine-readable instructions) to control one or more machines and/or perform operations of one or more machines. Examples of a logic circuit include one or more processors, one or more coprocessors, one or more microprocessors, one or more controllers, one or more digital signal processors (DSPs), one or more application specific integrated circuits (ASICs), one or more field programmable gate arrays (FPGAs), one or more microcontroller units (MCUs), one or more hardware accelerators, one or more special-purpose computer chips, and one or more system-on-a-chip (SoC) devices. Some example logic circuits, such as ASICs or FPGAs, are specifically configured hardware for performing operations (e.g., one or more of the operations described herein and represented by the flowcharts of this disclosure, if such are present). Some example logic circuits are hardware that executes machine-readable instructions to perform operations (e.g., one or more of the operations described herein and represented by the flowcharts of this disclosure, if such are present). Some example logic circuits include a combination of specifically configured hardware and hardware that executes machine-readable instructions. The above description refers to various operations described herein and flowcharts that may be appended hereto to illustrate the flow of those operations. Any such flowcharts are representative of example methods disclosed herein. In some examples, the methods represented by the flowcharts implement the apparatus represented by the block diagrams. Alternative implementations of example methods disclosed herein may include additional or alternative operations. Further, operations of alternative implementations of the methods disclosed herein may combined, divided, re-arranged or omitted. In some examples, the operations described herein are implemented by machine-readable instructions (e.g., software and/or firmware) stored on a medium (e.g., a tangible machine-readable medium) for execution by one or more logic circuits (e.g., processor(s)). In some examples, the operations described herein are implemented by one or more configurations of one or more specifically designed logic circuits (e.g., ASIC(s)). In some examples the operations described herein are implemented by a combination of specifically designed logic circuit(s) and machine-readable instructions stored on a medium (e.g., a tangible machine-readable medium) for execution by logic circuit(s).

As used herein, each of the terms "tangible machine-readable medium," "non-transitory machine-readable medium" and "machine-readable storage device" is expressly defined as a storage medium (e.g., a platter of a hard disk drive, a digital versatile disc, a compact disc, flash memory, read-only memory, random-access memory, etc.) on which machine-readable instructions (e.g., program code in the form of, for example, software and/or firmware) are stored for any suitable duration of time (e.g., permanently, for an extended period of time (e.g., while a program associated with the machine-readable instructions is executing), and/or a short period of time (e.g., while the machine-readable instructions are cached and/or during a buffering process)). Further, as used herein, each of the terms "tangible machine-readable medium," "non-transitory machine-readable medium" and "machine-readable storage device" is expressly defined to exclude propagating signals. That is, as used in any claim of this patent, none of the terms "tangible machine-readable medium," "non-transitory machine-readable medium," and "machine-readable storage device" can be read to be implemented by a propagating signal.

In the foregoing specification, specific embodiments have been described. However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of present teachings. Additionally, the described embodiments/examples/implementations should not be interpreted as mutually exclusive, and should instead be understood as potentially combinable if such combinations are permissive in any way. In other words, any feature disclosed in any of the aforementioned embodiments/examples/implementations may be included in any of the other aforementioned embodiments/examples/implementations.

The benefits, advantages, solutions to problems, and any element(s) that may cause any benefit, advantage, or solution to occur or become more pronounced are not to be construed as a critical, required, or essential features or elements of any or all the claims. The claimed invention is defined solely by the appended claims including any amendments made during the pendency of this application and all equivalents of those claims as issued.

Moreover in this document, relational terms such as first and second, top and bottom, and the like may be used solely to distinguish one entity or action from another entity or action without necessarily requiring or implying any actual such relationship or order between such entities or actions. The terms "comprises," "comprising," "has", "having," "includes", "including," "contains", "containing" or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element proceeded by "comprises . . . a", "has . . . a", "includes . . . a", "contains . . . a" does not, without more constraints, preclude the existence of additional identical elements in the process, method, article, or apparatus that comprises, has, includes, contains the element. The terms "a" and "an" are defined as one or more unless explicitly stated otherwise herein. The terms "substantially", "essentially", "approximately", "about" or any other version thereof, are defined as being close to as understood by one of ordinary skill in the art, and in one non-limiting embodiment the term is defined to be within 10%, in another embodiment within 5%, in another embodiment within 1% and in another embodiment within 0.5%. The term "coupled" as used herein is defined as connected, although not necessarily directly and not necessarily mechanically. A device or structure that is "configured" in a certain way is configured in at least that way, but may also be configured in ways that are not listed.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter may lie in less than all features of a single disclosed embodiment. Thus, the following claims are hereby incorporated into the Detailed Description, with each claim standing on its own as a separately claimed subject matter.

The invention claimed is:

1. A computer-implemented method for reading a picklist using a barcode reader having a processor and an imaging assembly with a field of view (FOV), the method comprising:
   capturing, by the imaging assembly, a first image of a first environment appearing within the FOV;
   decoding, by the processor, each barcode appearing within the first image;
   capturing, by the imaging assembly, a subsequent image of another environment appearing within the FOV;
   evaluating, through positional tracking of each of the barcode, whether one of the decodable barcode appears within a decode-reporting region of the FOV in the subsequent image; and
   responsive to detecting the one of the barcode appearing within the decode-reporting region, generating a decode signal representative of the one of the decodable barcode appearing within the decode-reporting region of the FOV being successfully decoded.

2. The computer-implemented method of claim 1, wherein the barcode reader further has an aiming assembly configured to project an aim light into the FOV, and wherein the decode-reporting region of the FOV is associated with the aim light.

3. The computer-implemented method of claim 2, wherein the decode-reporting region of the FOV is a region within the FOV occupied by the aim light.

4. The computer-implemented method of claim 1, wherein the method further includes:
   sequentially capturing at least one intervening image between capturing the first image and capturing the subsequent image;

for each of the at least one intervening image, decoding each new barcode captured within the respective intervening image;

for each following image succeeding the each of the at least one intervening image, evaluating, through positional tracking of each of the new barcode and each of the barcode, whether at least one of the new barcode or one of the barcode appears within the decode-reporting region of the FOV; and responsive to detecting the at least one of the new barcode or one of the barcode appearing within the decode-reporting region, generating a decode signal representative of the at least one of the new barcode or one of the barcode appearing within the decode-reporting region being successfully decoded.

5. The computer-implemented method of claim 1, wherein the capturing the first image, decoding each of the barcode, capturing the subsequent image, evaluating whether one of the barcode appears within the decode-reporting region, and generating the decode signal, occur within a single read operation.

6. The computer-implemented method of claim 1, wherein the generating the decode signal representative of the one of the barcode appearing within the decode-reporting region of the FOV being successfully decoded occurs irrespective of an ability to successfully decode the one of the decodable barcode appearing within the decode-reporting region of the FOV from the subsequent image.

7. A computer-implemented method for reading a picklist using a barcode reader having a processor and an imaging assembly with a field of view (FOV), the method comprising:

capturing, by the imaging assembly, a plurality of images in succession, each of the plurality of images capturing a view of an environment appearing with the FOV at a time of capturing the each of the plurality of images;

for each of the plurality of images, decoding, by the processor, each barcode newly appearing in a respective each of the plurality of images;

evaluating, through positional tracking of each of the barcode, whether one of the barcode appears within a decode-reporting region of the FOV in any one of the plurality of images; and responsive to detecting the one of the barcode appearing within the decode-reporting region, generating a decode signal representative of the one of the barcode appearing within the decode-reporting region of the FOV being successfully decoded.

8. The computer-implemented method of claim 7, wherein the barcode reader further has an aiming assembly configured to project an aim light into the FOV, and wherein the decode-reporting region of the FOV is associated with the aim light.

9. The computer-implemented method of claim 8, wherein the decode-reporting region of the FOV is a region within the FOV occupied by the aim light.

10. The computer-implemented method of claim 7, wherein the capturing the plurality of images, decoding each of the barcode, evaluating whether one of the barcode appears within the decode-reporting region, and generating the decode signal, occur within a single read operation.

11. The computer-implemented method of claim 7, wherein the generating the decode signal representative of the one of the barcode appearing within the decode-reporting region of the FOV being successfully decoded occurs irrespective of an ability to successfully decode the one of the barcode appearing within the decode-reporting region of the FOV any one of the plurality of images subsequent an image where the one of the barcode appearing within the decode-reporting region of the FOV newly appeared.

12. A barcode reader comprising:

a housing;

an imaging assembly within the housing and configured to capture a plurality of images in succession, each of the plurality of images capturing a view of an environment appearing with a field of view (FOV) of the barcode reader at a time of capturing the each of the plurality of images; and a processor and memory storing instructions that, when executed, cause the processor to:

for each of the plurality of images, decode each barcode newly appearing in a respective each of the plurality of images;

evaluate, through positional tracking of each of the barcode, whether one of the barcode appears within a decode-reporting region of the FOV in any one of the plurality of images; and responsive to detecting the one of the barcode appearing within the decode-reporting region, generate a decode signal representative of the one of the barcode appearing within the decode-reporting region of the FOV being successfully decoded.

13. The barcode reader of claim 12, further comprising:

an aiming assembly configured to project an aim light into the FOV, and wherein the decode-reporting region of the FOV is associated with the aim light.

14. The barcode reader of claim 13, wherein the decode-reporting region of the FOV is a region within the FOV occupied by the aim light.

15. The barcode reader of claim 12, wherein the memory storing further instructions that, when executed, cause the processor to:

capture the plurality of images, decode each of the barcode, evaluate whether one of the barcode appears within the decode-reporting region, and generate the decode signal, within a single read operation.

16. The barcode reader of claim 12, wherein the memory storing further instructions that, when executed, cause the processor to: generate the decode signal representative of the one of the barcode appearing within the decode-reporting region of the FOV being successfully decoded irrespective of an ability to successfully decode the one of the barcode appearing within the decode-reporting region of the FOV any one of the plurality of images subsequent an image where the one of the barcode appearing within the decode-reporting region of the FOV newly appeared.

17. A barcode reader comprising:

a housing;

an imaging assembly within the housing and configured to a first image of a first environment appearing within the field of view of the barcode reader; and a processor and memory storing instructions that, when executed, cause the processor to:

decode each barcode appearing within the first image;

instruct the imaging assembly to capture a subsequent image of another environment appearing within the FOV;

evaluate, through positional tracking of each of the barcode, whether one of the barcode appears within a decode-reporting region of the FOV in the subsequent image; and responsive to detecting the one of the barcode appearing within the decode-reporting region, generate a decode signal representative of the one of the barcode appearing within the decode-reporting region of the FOV being successfully decoded.

18. The barcode reader of claim 17, further comprising:
an aiming assembly configured to project an aim light into the FOV, and wherein the decode-reporting region of the FOV is associated with the aim light.

19. The barcode reader of claim 18, wherein the decode-reporting region of the FOV is a region within the FOV occupied by the aim light.

20. The barcode reader of claim 17, wherein the memory storing further instructions that, when executed, cause the processor to:
to instruct the imaging assembly to sequentially capture at least one intervening image between capturing the first image and capturing the subsequent image;
for each of the at least one intervening image, decode each new barcode captured within the respective intervening image;
for each following image succeeding the each of the at least one intervening image, evaluate, through positional tracking of each of the new barcode and each of the barcode, whether at least one of the new barcode or one of the barcode appears within the decode-reporting region of the FOV; and
responsive to detecting the at least one of the new barcode or one of the barcode appearing within the decode-reporting region, generate a decode signal representative of the at least one of the new barcode or one of the barcode appearing within the decode-reporting region being successfully decoded.

21. The barcode reader of claim 17, wherein the memory storing further instructions that, when executed, cause the processor to: capture the first image, decode each of the barcode, capturing the subsequent image, evaluate whether one of the barcode appears within the decode-reporting region, and generate the decode signal, within a single read operation.

22. The barcode reader of claim 17, wherein the memory storing further instructions that, when executed, cause the processor to: generate the decode signal representative of the one of the barcode appearing within the decode-reporting region of the FOV being successfully decoded irrespective of an ability to successfully decode the one of the barcode appearing within the decode-reporting region of the FOV from the subsequent image.

* * * * *